3,429,969
COMPOSITIONS AND METHODS FOR CONTROLLING COCCIDIOSIS IN POULTRY WITH 2,4-DISUBSTITUTED BENZAMIDE
Edward F. Rogers, Middletown, and Robert L. Clark, Woodbridge, N.J., assignors to Merck & Co., Inc., Rahway, N.J., a corporation of New Jersey
No Drawing. Continuation of application Ser. No. 241,038, Nov. 29, 1962. This application Dec. 28, 1964, Ser. No. 421,593
U.S. Cl. 424—230   6 Claims
Int. Cl. A61k 27/00; C07c 103/76

ABSTRACT OF THE DISCLOSURE

Orally administered compositions for control of coccidiosis in poultry are described wherein the active anticoccidial ingredient is a 2,4-disubstituted benzamide having at the 2-position a loweralkyloxy or a loweralkenyloxy group and at the 4-position nitro, amino, alkanoylamino or benzoylamino.

---

This application is a continuation of our pending application Ser. No. 241,038, filed Nov. 29, 1962, and now abandoned.

This invention relates to compositions and methods for treating and preventing a parasitic disease of animals. More specifically, it relates to feed compositions useful against the poultry disease coccidiosis. Still more particularly, it is concerned with the treatment and prevention of coccidiosis with certain 2,4-disubstituted benzamide compounds. It is concerned further with poultry feeds and feed supplements containing such substances as active anticoccidial agents.

Coccidiosis is a common and widespread poultry disease caused by species of protozoan parasites of the genus Eimeria. The more important of these species are E. maxima, E. acervulina, E. tenella, E. necatrix, E. brunetti, E. praecox and E. mitis. In turkeys, E. meliadigris and E. adenoides are also causative organisms of coccidiosis. When left untreated, the severe forms of the disease lead to poor weight gain, reduced feed efficiency and high mortality. For these reasons, the successful control of coccidiosis is highly important to the poultry industry.

Many of the coccidiostats heretofore available have been primarily effective against the E. tenella and E. necatrix species, and have had varying degrees of activity against other species such as E. maxima, E. acervulina and E. brunetti. We have now discovered a class of compounds that are primarily effective and useful in the treatment and prevention of coccidiosis due to this latter group of species. One object of the present invention, therefore, is to provide a new and important method of controlling coccidiosis. A further object is a method of controlling coccidial infections due to E. maxima, E. acervulina and E. brunetti. A further object is to provide poultry feeds containing one of the compounds described herein as an anticoccidial agent. A still further object is the provision of poultry feed supplement compositions containing such an anticoccidial agent. Other objects of the invention will be apparent from the following description of the invention.

In accordance with this invention, it has now been discovered that compounds having the structural formula

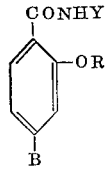

have a high degree of anticoccidial activity, particularly against E. maxima, E. acervulina and E. brunetti. In the above formula, B may be a nitro, amino, alkanoylamino or benzoylamino radical. Examples of suitable alkanoylamino substituents are those of the formula —NHCOR' where R' is a lower alkyl radical such as methyl, ethyl or propyl. Y in the foregoing formula represents hydrogen or a lower alkyl radical such as methyl, ethyl, propyl, isopropyl and the like. R is a lower alkoyl or lower alkenyl radical, examples of which are methyl, ethyl, propyl, butyl, isopropyl, allyl, methallyl and the like.

These substances, which may be described generally as 2,4-disubstituted benzamide compounds are now found to be highly useful in the prevention and control of coccidiosis when they are administered to poultry susceptible to or infected with coccidiosis, either by way of the drinking water or in the feed of the birds. It is necessary to feed only very minor amounts of such compounds to poultry since they have a very high degree of anticoccidial activity against the E. maxima, E. brunetti and E. acervulina species of coccidia.

The amount of 2,4-disubstituted benzamide compound required for optimal results in treating or preventing coccidiosis varies to some extent with the type and severity of the coccidial infection and the particular compound to be employed. As a general practice, the anticoccidial compounds of this invention are administered to poultry in the feed at concentrations of about 0.0005% to 0.02% by weight of the feedstuff, and drug concentrations of 0.002% to 0.0125% by weight of feed normally preferred. Levels of up to about 0.05% by weight of the feed may be used in treating an established outbreak of coccidiosis, but such higher dosages are not preferred for prophylactic treatment where medicated feed is given continuously to the poultry. It will be appreciated by those skilled in this art that the lowest levels consonant with both adequate control of coccidiosis and the development of immunity will be used in most instances in order to eliminate as far as possible any side effects that might be induced on prolonged feeding of unnecessarily high levels of these coccidiostats. The finished feed in which the above-described levels of coccidiostat are employed is a nutritionally adequate one containing sources of carbohydrate, protein, fat, vitamins, minerals and other nutritional factors commonly employed in commercial poultry raising.

In addition to administration via the solid feedstuff, the compounds of the invention may be administered to poultry by incorporation in the drinking water. The preferred dose levels in the drinking water are usually somewhat less than those employed in a solid feed inasmuch as poultry drink about twice as much as they eat. Administration via the drinking water is of advantage when using the compounds therapeutically rather than prophylactically. For this purpose it is convenient to prepare dispersible or water-soluble powders in which the coccidiostat is intimately dispersed in a suitable water-soluble or dispersible carrier such as dextrose or sucrose at concentrations of from about 0.3% to about 25% by weight. These solids may then be conveniently added to the drinking water by the poultry grower.

According to a further aspect of this invention there are provided compositions comprising poultry feed supplements or additives containing a 2,4-disubstituted benzamide compound as previously described as an effective anticoccidial ingredient. In such compositions the anticoccidial compound is mixed with or dispersed in an orally ingestible carrier vehicle that is nontoxic to the poultry and compatible with the finished feedstuff. These feed supplements contain a significantly higher percentage of coccidiostat than does the finished feed, and are mixed with or blended into the feedstuff before administration to the poultry. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compounds described hereinabove may be formulated into feed supplement compositions containing from about 1.0% to about 30% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 2.0% to about 20% by weight of active ingredient are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

Examples of typical feed supplements containing a coccidiostat of the present invention are (A)

| | Lbs. |
|---|---|
| 2-ethoxy-4-propionamidobenzamide | 1.5 |
| Amprolium | 25.0 |
| Wheat middlings | 73.5 |

(B)

| | |
|---|---|
| 2-ethoxy-4-benzoylaminobenzamide | 5.0 |
| Corn gluten feed | 95.0 |

(C)

| | |
|---|---|
| 2-methoxy-4-aminobenzamide | 2.0 |
| Corn germ meal | 40.0 |
| Corn distillers' grains | 58.0 |

(D)

| | |
|---|---|
| N'-ethyl-2-allyloxy-4-nitrobenzamide | 1.0 |
| Corn distillers' dried grains | 99.0 |

(E)

| | |
|---|---|
| 2-ethoxy-4-nitrobenzamide | 1.0 |
| 2-methyl-3,5-dinitrobenzamide | 25.0 |
| Distillers' dried grains | 74.0 |

Other 2,4-disubstituted benzamide compounds which are within the purview of the invention and which are utilized as described herein for treatment of coccidiosis are 2-propoxy-4-aminobenzamide, 2-isobutoxy-4-nitrobenzamide, N'-ethyl-2-ethoxy-4-nitrobenzamide and N'-ethyl-2-ethoxy-4-acetamidobenzamide.

The herein described compounds which have been found to be highly active coccidiostat compounds in accordance with this invention may be employed as the sole coccidiostat being administered to poultry. However, since these substances are primarily effective against the E. maxima, E. acervulina and E. brunetti species of coccidia and are less effective than many other coccidiostats against E. tenella and E. necatrix, it is a preferred embodiment of the invention to administer these 2,4-disubstituted benzamide compounds together with one or more other anticoccidial agents which are primarily active against E. tenella and E. necatrix. Examples of such other coccidiostats are amprolium, nicarbazin, glycarbylamide, 3,5-dinitrobenzamide and 2-methyl-3,5-dinitrobenzamide. Thus, one of the objects and achievements of this invention is the provision of highly active broad spectrum anticoccidial compositions which comprise a benzamide compound of the foregoing structural formula and at least one other anticoccidial agent. In many cases the efficacy of such a combination is greater than would be expected from the activity of either coccidiostat alone.

Many of the anticoccidial compounds of the present invention are described in the scientific literature since they have been made previously by others for different purposes. Those which are not specifically set forth in the literature are readily prepared from known compounds by processes and methods familiar to those skilled in the art.

According to a further embodiment of this invention, there are provided anticoccidial compounds wherein the substituent Y in the hereinabove structural formula is

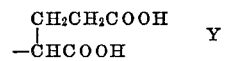

These compounds are conveniently defined as N-(substituted benzoyl)glutamic acid compounds although an analysis of their structural formula makes it clear that they are properly considered as N'-substituted benzamide compounds. As indicated in Example 1 below, these N-benzoyl glutamic acid derivatives are highly efficacious against coccidiosis due to E. maxima, and are utilized in poultry feeds and feed supplements in the manner and concentrations previously discussed for the other 2,4-disubstituted benzamide compounds of this invention.

The following examples are given for the purpose of illustration and not by way of limitation.

EXAMPLE 1

Anticoccidial activity of the compounds of this invention was determined in the following manner:

Straight run White Leghorn chicks, in groups of three each, were weighed and placed in cages with wire floors. They were fed ad libitum a standard laboratory ration in which graded concentrations of test compounds were blended just prior to use. Normal and infected control birds were fed basal ration containing no test compound. On the second day of the test the chicks were inoculated orally with 1,000,000 sporulated oocysts of Eimeria maxima. On the sixth day after inoculation all surviving birds were sacrificed and weighed. The small intestines were pooled in water and homogenized in a blender. Two aliquots of the homogenate were examined for oocysts in a hemocytometer. If the total count of oocysts was less than 30, the compound was rated as active.

Representative compounds of the invention have the activity set forth below, the dose level being the minimum level at which the compound was active.

| Compound: | Dose level (percent by wt. in feed) |
|---|---|
| 2-ethoxy-4-aminobenzamide | 0.006 |
| 2-ethoxy-4-nitrobenzamide | 0.006 |
| 2-ethoxy-4-acetamidobenzamide | 0.006 |
| N'-methyl-2-ethoxy-4-aminobenzamide | 0.001 |
| N-(2-ethoxy-4-aminobenzoyl)glutamic acid | 0.005 |
| N-(2-ethoxy-4-nitrobenzoyl)glutamic acid | 0.005 |

EXAMPLE 2

N'-methyl-2-ethoxy-4-aminobenzamide

A suspension of 5 g. of methyl-2-ethoxy-4-aminobenzoate in 25 ml. of 40% aqueous methylamine is heated on a steam bath for a total of 40 minutes. The solution is then cooled in an ice bath. N'-methyl-2-ethoxy-4-aminobenzamide crystallizes and is collected by filtration. It melts at 185° C. The product is further purified by recrystallization from ethanol, M.P. 187° C.

EXAMPLE 3

A. N-(2-ethoxy-4-nitrobenzoyl)-L-glutamic acid 7.5 grams of 2-ethoxy-4-nitrobenzoic acid are converted to the acid chloride by refluxing for two hours with 30 ml. of thionyl chloride. The excess reagent is then pumped off and the residue dissolved in 40 ml. of dioxane. This solution is then added dropwise with stirring to a cold (0-5°) solution of 5.9 g. of L-glutamic acid and 3.20 g. of sodium hydroxide in 40 ml. of water. During the addition, which requires one hour, dilute alkali is added to keep the reaction mixture slightly basic. After completion of the addition of the acid chloride, the reaction mixture is allowed to warm to room temperature, then acidified. The product, which crystallizes from water, is recrystallized from methanol-ether to give substantially pure N-(2-ethoxy-4-nitrobenzoyl) - L - glutamic acid, M.P. 170–171° C.

B. N-(2-ethoxy-4-aminobenzoyl)-L-glutamic acid

A solution of 6 g. of N-(2-ethoxy-4-nitrobenzoyl)-L-glutamic acid in 50 ml. of methanol is hydrogenated (30 lb. of hydrogen pressure) in the presence of 0.5 g. of 5% palladium-on-charcoal catalyst. On completion of the reduction, the reaction mixture is filtered, and filtrate concentrated to dryness. The residue is recrystallized from water to give substantially pure N-(2-ethoxy-4-aminobenzoyl)-L-glutamic acid, M.P. 164° C.

Any departure from the above description which conforms to the present invention is intended to be included within the scope of the claims.

What is claimed is:

1. The method of controlling coccidiosis in poultry that comprises orally administering to poultry an anticcocidial amount of a compound having the formula

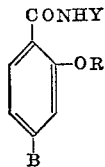

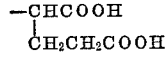

where R is selected from the group consisting of lower alkyl and lower alkenyl, Y is a member of the group consisting of hydrogen, loweralkyl and

—CHCOOH
|
CH₂CH₂COOH and B is selected from the group consisting of nitro, amino, loweralkanoylamino and benzoylamino groups.

2. The method of claim 1 wherein the defined compound is contained in poultry feed at a level of about 0.0005 to 0.02 percent by weight.

3. The method of claim 1 wherein the anticoccidial compound is N'-methyl-2-ethoxy-4-aminobenzamide.

4. The method of claim 1 wherein the anticoccidial compound is 2-ethoxy-4-nitrobenzamide.

5. An anticoccidial composition that comprises a poultry feedstuff having admixed therein from about 0.0005% to about 0.02% by weight of a compound having the formula

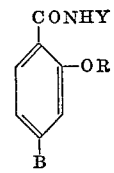

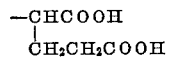

where R is selected from the group consisting of lower alkyl and lower alkenyl, Y is a member of the group consisting of hydrogen, loweralkyl and

—CHCOOH
|
CH₂CH₂COOH and B is selected from the group consisting of nitro, amino, loweralkanoylamino and benzoylamino groups.

6. An anticoccidial poultry feedstuff having dispersed therein from about 0.002% to about 0.0125% by weight of N'-methyl-2-ethoxy-4-aminobenzamide.

References Cited

UNITED STATES PATENTS

| | | | |
|---|---|---|---|
| 2,669,583 | 2/1954 | Clinton | 260—559 |
| 3,211,612 | 10/1965 | Rogers | 167—53.1 |
| 3,211,611 | 10/1965 | Clark | 167—53.1 |
| 3,211,612 | 10/1965 | Rogers | 167—53.1 |
| 3,228,833 | 1/1966 | Crounse | 167—53.1 |
| 3,231,467 | 1/1966 | Clegg | 167—53.1 |

ALBERT T. MEYERS, *Primary Examiner.*

S. FRIEDMAN, *Assistant Examiner.*

U.S. Cl. X.R.

424—251, 317